United States Patent Office 3,321,685
Patented May 23, 1967

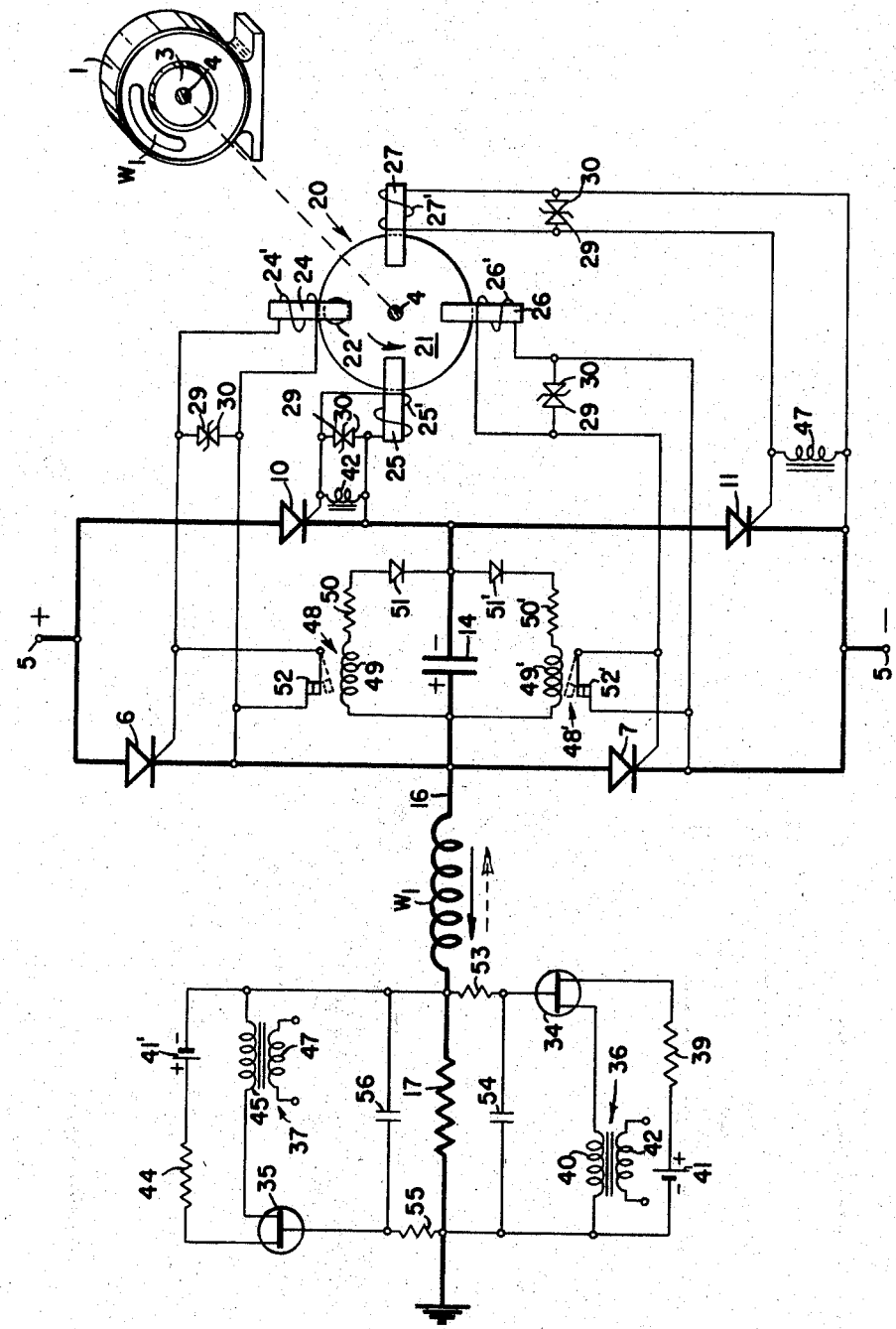

3,321,685
DYNAMOELECTRIC MACHINE INCLUDING CURRENT LIMITATION BY CAPACITANCE DISCHARGE CONTROL OF POWER WINDING SWITCH
Virgil I. Johannes, Plainfield, N.J., assignor to Carrier Corporation, Syracuse, N.Y., a corporation of Delaware
Filed Jan. 6, 1965, Ser. No. 423,765
5 Claims. (Cl. 318—138)

This invention relates to dynamoelectric machines, and more particularly to a motor intended for operation on direct current.

Dynamoelectric machines operate through the selective passage of energizing currents through the motor windings, the energizing currents being passed through the windings in a determined order to hold the magnetic fields established between the relatively movable machine rotor and stator in a predetermined operational relationship. The permissible amount of current which may be passed through the energizing windings is limited; excessive currents damage and destroy the machine windings. In dynamoelectric machines employing permanent magnet rotors, the occurrence of high transient currents which do not persist long enough to damage the machine windings may nevertheless demagnetize the machine permanent magnet.

If the dynamoelectric machine employs static type switching means such as silicon-controlled rectifiers in place of the conventional commutator and brush, control of the switching means may be exercised through a capacitor. In this type of arrangement the capacitor is discharged through the power switching means in opposition to the energizing current therein reducing current flow through the power switching means to render that switching means inoperative.

It is a principal object of the present invention to provide a unique control arrangement for dynamoelectric machines.

It is a further object of the present invention to provide an electronic operating arrangement for dynamoelectric machines in which the normal cycle for energizing and deenergizing the machine windings is interrupted when current flow through the energizing windings exceeds a preselected amount.

It is an object of the present invention to provide an electronic operating arrangement for dynamoelectric machines effective to interrupt the normal energizing cycle of the machine windings when the charge on the turn-off capacitor is below a predetermined amount.

It is an object of the present invention to provide a control arrangement for dynamoelectric machines of the type employing a permanent magnet rotor effective to deenergize the machine windings at the occurrence of a transient overcurrent condition in the winding to prevent demagnetization of the permanent magnet rotor.

The invention relates to a motor comprising in combination at least one energizing winding, a rotor movable in response to energization of the winding, at least one switching device adapted when rendered operative to energize the winding, a capacitor chargeable upon energizing of the winding, a second switching device adapter when rendered operative to discharge the capacitor through the winding to reduce current flow through the first switching device whereby the switching device is rendered inoperative and the winding deenergized, and control means for the first and second switching device including means responsive to rotor position adapted at a first rotor position to render the first switching device operative to energize the winding, and means responsive to predetermined current flow through the winding to render the second switching device operative to deenergize the winding.

Other objects will be apparent from the ensuing description and drawing in which:

The figure is a circuit diagram showing the operating arrangement for dynamoelectric machines of this invention.

Referring to the drawing, a direct current motor 1 having a rotor 3 is therein shown. Rotor 3 is preferably a permanent magnet rotor. Shaft 4 is operably connected to rotor 3.

A suitable source of primary direct current energy 5 is provided. A pair of series connected switching devices 6, 7 are connected across positive and negative sides of energy source 5. A second pair of switching devices 10, 11 are connected in parallel with switching devices 6, 7 across the positive and negative sides of energy source 5. Capacitor 14 is connected between the junction of the output electrode of switching device 6 and the input electrode of switching device 7 and the junction of the output electrode of switching device 10 and the input electrode of switching device 11. Line 16 connects motor energizing winding $W_1$ with the junction of the output electrode of switching device 6 and the input electrode of switching device 7. Resistance 17 is connected between winding $W_1$ and the ground.

The switching devices 6, 7, 10 and 11 are preferably solid state or semiconductor type switching devices such as silicon-controlled rectifiers. Other suitable switching devices such as thyratrons may be contemplated.

While the motor 1 is illustrated as having a single energizing winding $W_1$, it is understood that additional energizing windings may be employed under the control of suitable switching devices as will be more particularly explained hereinafter.

Switching devices 6, 7, 10 and 11 are regulated in response to movement of the motor rotor 3 by means of a suitable signal generating mechanism. The signal generating mechanism 20 illustrated in the drawing comprises a generally cylindrical disc-like element 21 of nonmagnetic material on shaft 4 having a magnet 22 secured thereto. A plurality of C-shaped core members 24, 25, 26, 27 formed from suitable ferromagnetic material are suitably disposed about the periphery of disc-like element 21 so that the core legs thereof overlap disc-like element 21. Windings 24', 25', 26', 27' respectively are connected across the control and output electrodes of switching device 6, 10, 7, and 11 respectively.

The movement of magnet 22 through the cores 24, 25, 26, 27 on rotation of motor rotor 3 generates a signal pulse in the winding 24', 25', 26', or 27' which, when applied to the control electrode of the switching device 6, 10, 7, and 11 associated therewith, renders that switching device operative. The amplitude and duration of the signal pulse generated in windings 24', 25', 26', 27' is dependent upon the speed of rotation of the motor rotor 3. Preferably, a pair of breakdown or Zener diodes 29, 30 are connected series opposing across windings 24', 25', 26', 27' to limit the amplitude of the signal pulse in the control electrode circuit of switching devices 6, 10, 7, and 11.

It is understood that additional ferromagnetic core members suitably disposed about the circumstance of disc-like element 21 may be provided for additional motor energizing windings.

To protect winding $W_1$ from excessive current and permanent magnet rotor 3 against possible demagnetization due to transient overcurrents in winding $W_1$, an overload control utilizing a pair of unijunction transistors 34, 35 and control transformers 36, 37 is provided. Unijunction transistor 34 is series connected with resistor 39 and primary coil 40 of control transformer 36 across the positive and negative sides of a suitable source of secondary direct current energy such as battery 41. The control electrode of unijunction transistor 34 is connected through resistor 53 to the junction of winding $W_1$ and resistance 17. The secondary coil 42 of control transformer 36 is connected across the control and output electrodes of switching device 10. Capacitor 54 is connected between the control electdode of transistor 34 and the negative side of battery 41 across transformer primary coil 40.

Unijunction transistor 35 is series connected with resistor 44 and primary coil 45 of control transformer 37 across the positive and negative sides of secondary battery 41'. The control electrode of unijunction transistor 35 is connected through resistor 55 to the junction of resistance 17 and ground. The secondary coil 47 of control transformer 37 is connected across the control and output electrodes of switching device 11. Capacitor 56 is connected between the control electrode of transistor 35 and the negative side of battery 41' across transformer primary coil 45.

To guard against premature operation of switching devices 6, 7 before the build-up of sufficient charge on capacitor 14 to enable capacitor 14 to render switching devices 6 or 7 inoperative when turn-off switching device 10 or 11 is operated, a pair of coils 49, 49' of high speed relays 48, 48' respectively are each series connected with a resistor 50, 50' and a diode 51, 51' across capacitor 14. Normally closed contacts 52, 52' of relays 48, 48' respectively are connected across the control electrode circuit of switching devices 6, 7 respectively. Relay contacts 52, 52' while closed short the control electrode circuits of switching devices 6, 7 thereby preventing operation of switching devices 6, 7 in a manner to be more fully explained hereinafter.

On counterclockwise movement of motor rotor 3 as shown by the arrow with disc-like element 21 of signal generating mechanism 20 in the position shown, the signal pulse generated in winding 24' upon movement of magnet 22 through core member 24 places a positive potential on the control electrode of switching device 6 to render the switching device 6 operative. Switching device 6 completes a circuit from the positive side of battery 5 through winding $W_1$ and resistance 17 to energize winding $W_1$. Current flow through winding $W_1$ is in the direction shown by the solid line arrow. Capacitor 14 is charged in the manner shown in the drawing. The manner by which capacitor 14 is charged will be more apparent hereinafter. Accordingly, contacts 52, 52' of relays 48, 48' respectively are open.

As magnet 22 moves counterclockwise through core member 25, the signal pulse generated in winding 25' thereof renders switching device 10 operative. Operation of switching device 10 connects capacitor 14 across switching device 6. The discharge of capacitor 14 through switching device 6 reduces current flow through switching device 6 to render switching device 6 inoperative. Capacitor 14 discharges and then recharges in a polarity opposite to that shown in the drawing. As capacitor 14 recharges, the flow of current through switching device 10 is reduced to render switching device 10 inoperative and interrupt the circuit between winding $W_1$ and the positive side of battery 5. The discharge and recharge of capacitor 14 closes and then opens contacts 52, 52' of relays 48, 48' as will be more fully described hereinafter.

The continued counterclockwise movement of disc-like element 21 brings magnet 22 within core member 26, the resultant signal pulse generated in winding 26' places a positive potential on the control electrode of switching device 7 to render switching device 7 operative. Switching device 7 completes a circuit through resistance 17 and winding $W_1$ to the negative side of battery 5 to energize winding $W_1$. Current flow in winding $W_1$ is in the direction shown by the dotted line arrow.

As magnet 22 moves counterclockwise through core member 27, the signal pulse generated in winding 27' thereof renders switching device 11 operative to discharge capacitor 14 through switching device 7 to render switching device 7 inoperative in the manner explained heretofore. As capacitor 14 recharges to the polarity shown in the drawing, the flow of current through switching device 11 is reduced to render switching device 11 inoperative and interrupt the circuit between winding $W_1$ and the negative side of battery 5.

Upon operation of switching device 6 or 7, current flow through the winding $W_1$ rises. At the occurrence of a preset current in winding $W_1$, representing the highest current tolerable, the signal applied to the control electrode of either unijunction transistor 34 or 35 renders the transistor 34 or 35 operative. Operation of transistor 34 discharges capacitor 54 through primary winding 40 of control transformer 36 resulting, through transformer action, in a pluse of current through transformer secondary winding 42 to place a positive potential on the control electrode of switching device 10 to render switching device 10 operative. Operation of switching device 10 renders switching device 6 inoperative to deenergize winding $W_1$ as described heretofore.

Operation of unijunction transistor 35 discharges capacitor 56 through primary winding 45 of control transformer 37 resulting, through transformer action, in a pulse of current through transformer secondary winding 47 to place a positive potential on the control electrode of switching device 11 to render switching device 11 operative. Operation of switching device 11 renders switching device 7 inoperative to deenergize winding $W_1$ as described heretofore.

The discharge of capacitor 14 to render switching devices 6 and 7 inoperative as described heretofore deenergizes coils 49, 49' or relays 48, 48' respectively to permit the contacts 52, 52' associated therewith to close. Coils 49, 49' remain deenergized until the charge on capacitor 14 reaches a predetermined level sufficient to render switching devices 6, 7 inoperative upon operation of the switching devices 10 or 11 associated therewith. By shorting the control electrode circuit of switching devices 6, 7, contacts 52, 52' effectively prevent operation of switching devices 6, 7 respectively by the signal generating mechansim 20 before capacitor 14 reaches a charge sufficient to turn off the switching devices 6, 7. Diodes 51, 51' limit current flow in the coil circuits of relays 48, 48' to a single direction.

While I have described a preferred embodiment of the invention, it will be understood that the invention is not limited thereto since it may be otherwise embodied within the scope of the following claims.

I claim:

1. In a motor having at least one energizing winding and a rotor movable in response to energization of said winding, the combination of at least one switching device adapted when rendered operative to energize said winding, a capacitor chargeable upon energization of said winding, a second switching device adapted when rendered operative to discharge said capacitor through said winding to reduce current flow through said first switching device whereby said first switching device is rendered inoperative and said winding deenergized, and control means for said first and second switching devices including means responsive to rotor position adapted at a first rotor position to render said first switching device operative to energize said winding, and means responsive to predetermined current flow through said winding to render said second switching device operative to deenergize said winding.

2. A motor according to claim 1 in which said rotor position responsive means is adapted to intervene to render said second switching device operative to deenergize said winding following movement of said motor rotor to a second position.

3. A motor according to claim 1, said control means including means for sensing the charge on said capacitor adapted to override said rotor position responsive means to prevent operation of said first switching device when the charge on said capacitor is insufficient to render said first switching device inoperative upon discharge of said capacitor by said second switching means.

4. In a motor having at least one energizing winding with a rotor movable in response to energization of said winding, the rotor comprising a permanent magnet rotor, the combination of a first solid state switching device adapted when rendered operative to energize said winding, control means for said first switching device adapted at a first rotor position to render said first switching device operative, a capacitor chargeable on energization of said winding, a second solid state switching device adapted when rendered operative to discharge said capacitor through said winding to reduce current flow through said first switching device whereby said first switching device is rendered inoperative and said winding deenergized, said control means being operable following movement of said rotor to a second position to render said second switching device operative, and means for protecting said permanent magnet rotor against demagnetization, said protecting means overriding said control means to render said second switching device operative at a predetermined over-current in said winding to deenergize said winding.

5. In a control arrangement for operating a motor having energizing windings and a rotor movable on energization of said windings, the combination of a solid state switching device for each of said windings adapted when rendered operative to energize the winding associated therewith to move said rotor, means for rendering said switching devices operative in selected order to operate said motor, capacitance means chargeable upon energization of said windings, and means for sensing current in each of said windings adapted at a predetermined high winding current to discharge said capacitance means through the switching device for that winding to render said switching device inoperative and deenergize said winding.

No references cited.

ORIS L. RADER, *Primary Examiner.*

G. SIMMONS, *Assistant Examiner.*